March 29, 1932.  S. B. DAUGHERTY  1,851,163
APPARATUS FOR EFFECTING A PARTIAL SEPARATION OF MIXED GASES
Filed April 14, 1928
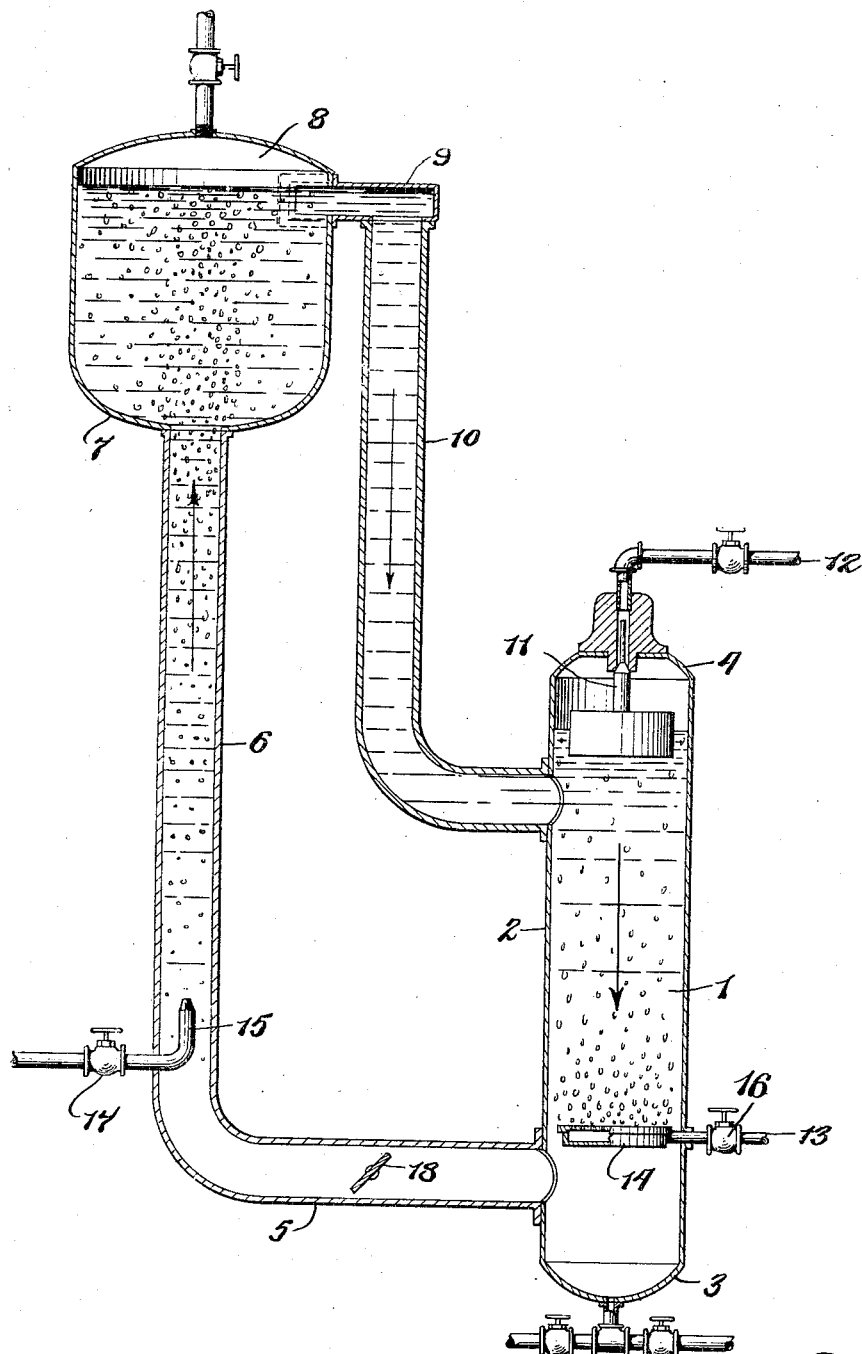
Inventor
Samuel B. Daugherty
By Popper Powers
Attorneys Patented Mar. 29, 1932

1,851,163

UNITED STATES PATENT OFFICE

SAMUEL B. DAUGHERTY, OF BUFFALO, NEW YORK

APPARATUS FOR EFFECTING A PARTIAL SEPARATION OF MIXED GASES

Application filed April 14, 1928. Serial No. 270,054.

This invention relates to a method and apparatus for effecting a partial separation of mixed gases and more particularly to a method and apparatus for effecting their separation by their absorption into liquids.

It is a well known fact that gases are soluble in liquids and that water dissolves many gases. Some of these gases, like carbon dioxide, are very soluble, while others, such as hydrogen, are only slightly soluble. When a gas is bubbled through water, the gas dissolves until the water is saturated with gas. The solubility of different gases varies between very wide limits, as set forth in the following table in which the figures represent the number of liters of the gas soluble in one liter of water at 0° C. and 760 mm. pressure:

| | |
|---|---|
| Hydrogen | 0.0124 |
| Nitrogen | 0.0233 |
| Oxygen | 0.0489 |
| Carbon dioxide | 1.713 |
| Hydrogen chloride | 506.0 |
| Ammonia | 1298.9 |

Pressure has a marked influence on the solubility of gases. The greater the pressure, the greater the amount of gas dissolved, or more accurately stated, the weight of a gas dissolved by a given weight of water is directly proportional to the pressure, if the temperature is constant. For example, if a liter of water dissolves 5 gm. of gas at 760 mm., it will dissolve 10 gm. at 2 atmospheres.

By utilizing these two principles of the solution of gases in liquids it is possible to effect a partial separation of mixed gases by the provision of means to absorb the mixed gas under pressure and subsequently releasing the pressure to recover the absorbed gas. In calculating the proportion of gases recovered, it is, of course, necessary to take into consideration the partial pressure of each gas to determine the amount of each gas dissolved.

One of the principal objects of this invention is to provide a continuous acting separator in which the gas is forced into the fluid and absorbed in a high pressure zone and the solution is then conducted to a low pressure zone and the adsorbed gas released, the spent fluid being subsequently conducted to the high pressure zone where it is recharged with the gas. By such a continuous process large volumes of gas can be handled with a minimum expenditure of labor and power.

A further object is to provide such an apparatus which employs the buoyancy of the contained gas to maintain the circulation of the liquid, thereby eliminating all power devices except for the means for forcing the mixed gas under pressure into the high pressure zone of the separator.

Another aim is to provide such an apparatus which may be easily started in its separating action by the initial introduction of a pure gas to render the uptake column of water more buoyant than the downtake column.

A still further aim is to provide such a separator which is efficient in operation and can be adjusted to absorb practically all of the gas which is desired to be recovered and in which the gas from which it is partially separated may also be withdrawn.

Other objects are to provide such a separator which is automatic in operation, simple in construction and will not get out of order with continuous use.

In the accompanying drawing the figure is a sectional view of a separator embodying my invention, the supports and other non-essential features having been eliminated.

The gases are dissolved in a vertical absorption chamber 1 which is composed of a cylindrical casing 2, a lower head 3 and an upper head 4. To the lower end of the cylindrical casing of the absorbing chamber 2 is connected a horizontal pipe 5 which connects at its outer end with a vertical pipe 6. The vertical pipe 6 extends above the absorbing chamber casing and is connected to the lower end of the casing 7 of an enlarged closed releasing chamber 8. Projecting horizontally outward from the upper part of the absorber chamber casing is a hollow element 9 which is connected by a return or downtake pipe 10 with the upper part of the casing of the absorbing chamber 1. The lower end of the return pipe 10 connects with the absorbing chamber a substantial distance below the upper head 4 thereof.

The apparatus described is filled with an absorbing fluid such as water, so that the upper level of the same is above the upper end of the return pipe 10 and provides a space in the upper part of the releasing chamber 8 and hollow element 9 for collecting the absorbed gas. The unabsorbed gas is collected at the upper end of the absorbing chamber 1 and the liquid level in this chamber is preferably maintained practically constant by an automatic float valve 11 which controls the escape of gas through the gas outlet pipe 12. This valve opens and permits the escape of the unabsorbed gas when more than a predetermined gas pressure is built up in the upper end of the absorbing chamber and lowers the liquid level in the absorbing chamber. It is obvious that should the level drop below the inlet of the return pipe 10, unabsorbed gas would pass through the return pipe and mix with the collected absorbed gas in the releasing chamber 8.

The mixed gas to be separated is forced under pressure into the lower end of the absorbing chamber above the outlet thereof. This gas is introduced through a supply pipe 13 which extends through the side wall 4 of the absorbing chamber and at its inner end carries a hollow head 14 having a plurality of restricted openings which feed the mixed gases to the absorbing liquid in the form of a plurality of small streams which insure its proper absorption in the liquid.

Assuming that the absorbing liquid is water; that a circulation of the water through the system is started; that the gas to be recovered is carbon dioxide; and that the gases entering the absorbing chamber consist of a mixture of oxygen, nitrogen, carbon dioxide and carbon monoxide, such as would be formed in the flue from a furnace in which coal is being burned, and after the flue gases have been passed through a washer to remove the solids and a tower filled with limestone and water to remove the sulfur dioxide, the separator would operate as follows:

The mixed gases are forced through the supply pipe 13 into the perforated head 14 from which they bubble up through the water in the absorbing chamber. On account of its greater solubility in water and also the greater proportion of carbon dioxide in the flue gases, a much larger proportion of carbon dioxide will be dissolved than the other gases of this mixture. The carbon dioxide and a small proportion of the other gases will, therefore, be dissolved and the undissolved gases pass up through the water and accumulate at the upper end of the absorbing chamber from which they pass out when pressure sufficient to open the automatic float valve 11 has been built up. The charged water flows from the absorbing chamber into the horizontal pipe 5 and thence into the vertical pipe 6. As soon as the charged water in the vertical pipe 6 passes above the level of the charging head 14, the pressure becomes less than the pressure at which the water was charged and this lowering of pressure will cause the dissolved gases to be expelled from the water with which it is saturated, and bubbles of the dissolved gas will begin to form. As the charged water passes upwardly, the pressure becomes less and less and consequently the bubbles increase in size. The charged water then passes into the releasing chamber where, due to its large cross sectional area, the velocity of the water is greatly diminished and the bubbles of expelled gas are given sufficient time to come to the surface and accumulate in the releasing chamber. Since the hollow element 9 is arranged at the level of the liquid, the only pressure on the water is atmospheric pressure and therefore all gas in excess of the amount with which the water is saturated at atmospheric pressure is expelled.

The spent water then flows through the return or downtake pipe 10 into the absorbing chamber where it passes the charging head, and is recharged and the process is repeated.

As bubbles form in the vertical pipe 6, and in the releasing chamber 8, this column of water is, of course, lightened and since it is lighter than the down flowing column of water which includes the spent water in the downtake pipe 10 and the absorbing chamber, the circulation of water through the apparatus will be maintained as long as the gas is forced through the charging head into the absorbing chamber.

It is, of course, necessary to start the flow and for this purpose a small pipe 15 passes through the lower part of the vertical pipe 6 and through this pipe carbon dioxide, or the other gas to be collected in the releasing chamber is forced into the lower end of the pipe 6. This gas bubbles up and lightens the column of water and starts its upward flow. The valve 16 controlling the flow of mixed gas into the absorbing chamber is then opened and after the process is started so that an automatic flow is maintained the valve 17 in the starting pipe 15 is closed.

A suitable damper 18 can be placed either in the pipe 5 or in the return pipe 10 to slow down the velocity of circulation so that the bubbles rising in the absorbing chamber will move upward faster than the water, or other liquid moves downward.

A very considerable concentration of carbon dioxide in the releasing chamber will have resulted, and by this apparatus it is possible to recover this gas from extremely lean mixtures.

Since, in accordance with Dalton's law of partial pressures when a mixture of gases dissolves in water each dissolves independently of the other and proportionally to its partial pressure, the gases in the releasing chamber may be passed through another separator and as this gas is largely carbon dioxide and consequently the preponderance of the pressure on this mixed gas is borne by the carbon dioxide, a very much greater concentration of carbon dioxide will be secured and ultimately can be obtained in practically pure form.

Similarly, if pure air is forced into the absorbing chamber, since the ratio of oxygen to nitrogen in the air is about 1:4, and therefore ⅕ of the pressure is sustained by the oxygen and ⅘ by the nitrogen, the ratio of saturation of the oxygen and nitrogen in the water will be about 1:2, i. e., $$\tfrac{1}{5} \times 2 : \tfrac{4}{5} \times 1 :: 1 : 2,$$

and consequently the gas accumulating in the releasing chamber will be one part oxygen to two parts of nitrogen, or it will contain about 50% more oxygen than air. If this enriched air is then passed into a second separator, the partial pressure borne by the oxygen will, of course, be much greater and consequently a greater concentration will result. It is important to bear in mind that the solubility of mixed gases is determined not only by the specific solvent power as free gases but also by the partial pressure borne by each since if it depended only upon the specific solvent power of each gas, a concentration of oxygen from air over about four parts of oxygen to one part nitrogen (the relative solubility as free gases) could not be obtained through saturated solution in water.

It is, of course, also obvious that, for example, in the separation of oxygen and nitrogen from air, by continuous processing practically pure nitrogen can be recovered.

As a whole, this invention provides a very simple apparatus for concentrating mixed gases, it is continuous in its action and will handle large volumes of gas, it is inexpensive to operate, is easily started and when started will automatically operate without further attention as long as mixed gas is forced into it, it will recover gas from extremely lean mixtures and contains few moving parts and is, therefore, not liable to get out of order.

I claim as my invention:

1. An apparatus of the character described comprising an absorbing chamber, containing liquid under a relatively high pressure, an enlarged releasing chamber containing a liquid under a relatively low pressure, a conduit connecting the lower part of said absorption chamber with the lower part of said releasing chamber and in continuous intercommunication therewith, and means at the lower end of said absorption chamber for passing a mixed gas through said liquid, said elements be arranged so that the bouyancy of the gas in said liquid creates a downward flow of the liquid in said absorption chamber, through said pipe and up through said releasing chamber.

2. An apparatus of the character described comprising an absorption chamber, a releasing chamber elevated relative to said absorption chamber, a pipe connecting the lower part of said absorption and releasing chambers, a return pipe connecting the upper part of said chambers, said chambers being filled with a liquid and means arranged in the lower part of said absorption chamber for forcing a stream of mixed gas into said liquid, said elements being so arranged that the buoyancy of said gas in said liquid while in said first mentioned pipe and releasing chamber circulates the liquid through said system.

3. An apparatus of the character described comprising an absorption chamber, a releasing chamber elevated relative to said absorption chamber, a pipe connecting the lower part of said absorption and releasing chambers, a return pipe connecting the upper part of said chambers, said chambers being filled with a liquid, means arranged in the lower part of said absorption chamber for forcing a stream of mixed gas into said liquid, said elements being so arranged that the buoyancy of said gas in said liquid while in said first mentioned pipe and releasing chamber circulates the liquid through said system, and means for adjustably retarding the flow of liquid through said system.

4. An apparatus of the character described comprising an absorption chamber, a releasing chamber elevated relative to said absorption chamber, a pipe connecting the lower part of said absorption and releasing chambers, a return pipe connecting the upper part of said chambers, said chambers being filled with a liquid, means arranged in the lower part of said absorption chamber for forcing a stream of mixed gas into said liquid, said elements being so arranged that the buoyancy of said gas in said liquid while in said first mentioned pipe and releasing chamber circulates the liquid through said system and means for starting the flow of liquid through said system comprising a starting pipe through which gas is adapted to be discharged into said first mentioned pipe.

5. An apparatus of the character described comprising an absorbing chamber, a releasing chamber elevated relative to said absorbing chamber, a conduit connecting the lower parts of said chambers and in continuous intercommunication therewith, a return conduit connecting the upper part of said releasing chamber with the upper part of said absorption chamber a substantial distance below the upper head thereof and in continuous intercommunication therewith, said chambers and conduits being filled with a liquid, means arranged in the lower part of said absorption chamber for forcing an excess of mixed gas into said liquid, said elements being arranged so that the liquid is circulated through said system through the buoyancy of the said gas in said liquid, means for withdrawing the gas absorbed in said liquid from the upper part of said releasing chamber, and means for withdrawing the unabsorbed gas from the upper part of said absorbing chamber.

6. An apparatus of the character described comprising an absorbing chamber, a releasing chamber elevated relative to said absorbing chamber, a conduit connecting the lower parts of said chambers and in continuous intercommunication therewith, a return conduit connecting the upper part of said releasing chamber with the upper part of said absorption chamber a substantial distance below the upper head thereof and in continuous intercommunication therewith, said chambers and conduits being filled with a liquid, a perforated head arranged in the lower part of said absorption chamber above the outlet thereof, means for forcing mixed gas into said head, said elements being arranged so that the liquid is circulated through said system through the buoyancy of the said gas in said liquid, said liquid means for withdrawing the gas absorbed in said liquid from the upper part of said releasing chamber, and means for withdrawing the unabsorbed gas from the upper part of said absorbing chamber.

7. An apparatus of the character described comprising an absorbing chamber, a releasing chamber elevated relative to said absorbing chamber, a pipe connecting the lower parts of said chambers and having a vertical part leading to said releasing chamber, a return pipe connecting said releasing chamber with the upper part of said absorption chamber a substantial distance below the upper head thereof, said chambers being adapted to be filled with a liquid, a perforated head arranged in the lower part of said absorption chamber above the outlet thereof, a mixed gas supply pipe connected with said head, automatic valve means actuated in response to the pressure in the upper part of said absorption chamber for permitting the escape of the unabsorbed gas therefrom, and means for withdrawing the released absorbed gas from the upper part of said releasing chamber, said liquid being circulated through the buoyancy of the gas contained in the liquid in the vertical part of said first mentioned pipe and said releasing chamber.

8. An apparatus of the character described comprising an absorbing chamber, a releasing chamber elevated relative to said absorbing chamber, a pipe connecting the lower parts of said chambers and having a vertical part leading to said releasing chamber, a return pipe connecting said releasing chamber with the upper part of said absorption chamber a substantial distance below the upper head thereof, said chambers being adapted to be filled with a liquid, a perforated head arranged in the lower part of said absorption chamber above the outlet thereof, a mixed gas supply pipe connected with said head, automatic valve means actuated in response to the pressure in the upper part of said absorption chamber for permitting the escape of the unabsorbed gas therefrom, means for withdrawing the released absorbed gas from the upper part of said releasing chamber, said liquid being circulated through the buoyancy of the gas contained in the liquid in the vertical part of said first mentioned pipe and said releasing chamber, and means for initially starting the circulation of said liquid comprising a pipe through which gas is adapted to be forced into the lower end of the vertical part of said first mentioned pipe.

In testimony whereof I hereby affix my signature.

SAMUEL B. DAUGHERTY.